US005181733A

United States Patent [19]

Tague

[11] Patent Number: 5,181,733

[45] Date of Patent: Jan. 26, 1993

[54] ANTI-TIP DEVICE FOR WHEELCHAIR

[76] Inventor: George E. Tague, 2900 Valley View Rd., Sioux Falls, S. Dak. 57106

[21] Appl. No.: 806,210

[22] Filed: Dec. 13, 1991

[51] Int. Cl.[5] ........ B62B 5/02

[52] U.S. Cl. ........ 280/304; 280/304.1; 280/755; 280/767; 297/310

[58] Field of Search ........ 280/293, 42, 298, 767, 280/300, 303, 304, 5.32, 304.1, 755, 250.1, 5.2, 657, 762, 47.38, 763.1; 297/DIG. 4, 310

[56] References Cited

U.S. PATENT DOCUMENTS 3,256,040 6/1966 Mize et al. ........ 297/310
3,848,883 11/1974 Breacain ........ 297/310
4,565,384 1/1986 Mosford ........ 297/DIG. 4
4,717,169 1/1988 Shaffer ........ 280/657
4,721,321 1/1988 Haurg et al. ........ 280/250.1
4,730,842 3/1988 Summers et al. ........ 280/42
4,768,797 9/1988 Friedrich ........ 280/304.1
5,137,295 8/1992 Peek ........ 280/304.1

*Primary Examiner*—Richard M. Camby

[57] ABSTRACT

An easily adjustable anti-tipping device for a wheelchair. The device is arranged so that a knob or lever adjacent the foot of the handicapped person can be turned to rotate the anti-tipping bar to its useful position. The device may be added to the tubular lower rail of an existing wheelchair by extending a rod through the lower rail and attaching it to the anti-tipping bar.

9 Claims, 1 Drawing Sheet

ANTI-TIP DEVICE FOR WHEELCHAIR

BACKGROUND AND SUMMARY OF THE INVENTION

This invention pertains to anti-tipping devices for wheelchairs and more particularly to such a device which is easily adjustable from the front the chair.

One very common hazard in the use of a wheelchair—particularly a hand-operated chair—is that of tipping over backwards. This is especially true in hand operated chairs because the operator typically reaches back each time a new grip on the wheel is necessary. Both the leaning back and the reaction to the torque applied to the wheel combine to provide a considerable tendency to tipping. When there is any additional impetus such as going up a ramp, a hill or a curbing, the frequency of tipping becomes considerable. Nearly every operator of such a chair has experienced this problem.

Many wheelchairs are not equipped with anti-tipped bars. Such bars extend from the frame toward the rear of the chair and are placed so that the bar will engage the surface on which the chair rolls. However, such bars cannot be straight bars nor can the end touching the surface be normally in that position for regular use. In that position, the bar will interface with the operation of the chair going down a curbing or steps, over a threshold slightly higher than normal or in many similar situations. Therefore, the anti-tip bar is usually bent from the frame and is rotatable from an upward position for regular operation of the chair to a downward position where the end of the bar is near the surface.

Because two positions are required, it becomes desirable that the operator be able to shift the bar without additional help. Current chairs are designed for persons who are handicapped only in leg functions. Typically, the anti-tipping bar is rotatably journalled in a frame member of the chair so it can be rotated between the two necessary positions. A spring detent or similar latch is used to hold the anti-tip bar in position. Because the operator for whom the chair is customarily designed can use both arms and hands this creates little problem.

However, when the operator has an impaired function of one hand or arm, the problem is compounded. It then becomes necessary to reach with the good hand or arm across the back of the chair to release the latch or detent and rotate the bar. In most instances this is very difficult or impossible.

By my invention, I provide for a rotating device for turning the anti-tip bars from the front of the chair. The operating means is conveniently located for use by either hand singly so that an operator even with a fully disabled single arm or hand can still easily and successfully operate the anti-tip bar, thus enhancing her or his own safety from tipping while retaining independence in the operation of the chair.

DESCRIPTION

Figure 1:
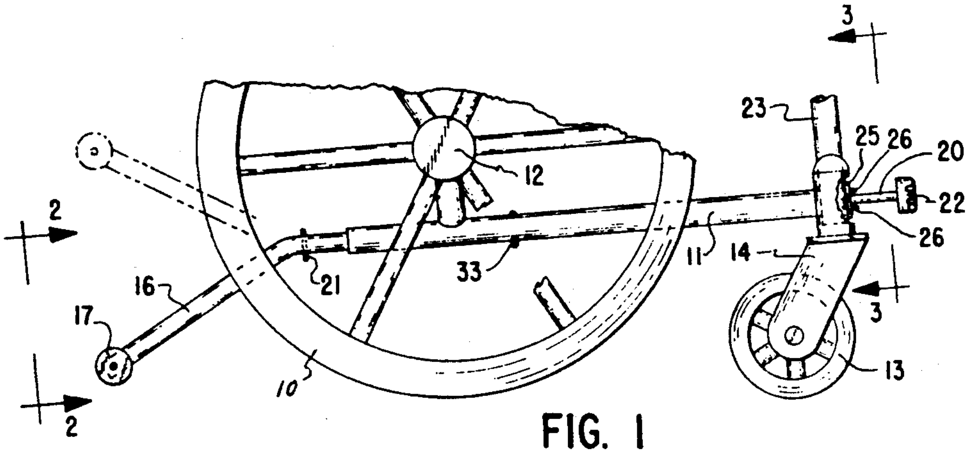
FIG. 1 is a partial side elevational view of the lower part of a wheelchair showing my anti-tipping device in place.
Figure 2:
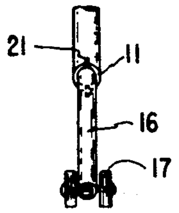
FIG. 2 is a rear elevational view from line 2—2 of FIG. 1.

Briefly my invention comprises a rotating anti-tip device for a wheelchair. The mechanism is contained within a member of the wheelchair and has means near the front of the chair for the operation.

More specifically and referring to the drawings, the device is designed for use with an ordinary hand operated wheelchair having a large rear wheel 10 pulled or pushed by the occupant of the chair.

The frame on which the wheel 10 is mounted is ordinarily made of tubular members including a nearly horizontal bottom rail 11 extending from somewhat rear of the rear axle 12 to a forward position. Near the forward position, castering front wheels 13 are mounted on casters 14 attached to the lower rail 11.

This usual anti-tipping extension 16 is telescopically fitted into the bottom rail member 11 and is also tubular. Rollers 17 at the outer end of the extension 16 serve a dual purpose. They both protect the outer end of the extension from abrasion on contact with the surface on which the chair is rolling; and they allow some rolling action as they contact the surface so that the chair will continue to move. Normally the extensions 16 are rotatable in the bottom rail 11 and are held either in the down or use position as shown by the solid line in FIG. 1, or in the up or travel position shown by the dashed line in that figure by detents engaged between the rail 11 and extension 16. These detents are located beneath and somewhat behind the axle 12 where they can be reached alternately by the respective arms of the operator on the side being rotated. However, easy use of this former device requires that the operator has full use of both arms and both hands (especially fingers to release the detent). The location makes virtually impossible the release of the detent by a person having only one good hand or arm. Many persons lose the function of one hand or arm as well as a leg or both legs in severe accidents or from degenerative diseases. Therefore, in the ordinary chair, many people are now denied full use of the anti-tipping device because they cannot properly operate it.

My invention makes possible the use of the anti-tipping device by people who also have impaired use of their hands by moving the control to the front of the chair where one arm can cross over the body of the operator to turn the extension 16 on the side of the bad hand or arm as well as readily turning such extension on the side of the good hand. In order to accomplish this change, a motion transmitting means or rod 20 is fastened to the extension 16 by a pin 21 or the like. This rod extends through the bottom rail 11 to the front end of that rail. An operating means or knob or handle 22 is fixed to the rod at that end. Thus, by rotating the knob or handle 22, the extension can be turned as desired.

To be fully useful, added changes are necessary as illustrated. Detents are still not very usable because they usually require finger or thumb pressure to release them. Therefore, I provide a mechanism to hold the extension 16 selectively in either of its positions. Because the rod 20 is ordinarily substantially smaller in diameter than the rail 11, I simply drill a hole in the vertical member 23 at the front end of the rail 11 and use a bushing 24 in the extension 16 to provide proper freedom for sliding or rotation of the rod 20. The bushing 24 may be tightly fitted to both the rod 20 and the extension 16 so that it stays in place and is therefore principally a spacer. The hole in the member 23 provides a journal so that the rod is free to slide axially relative to the rail 11. It is now evident that movement of the handle 22 is possible both relatively and slidable axially carrying the rod 20 and the extension 16 with it. It may be noted that the extension 16 is both slidable and rotatable inside the rail 11.

Figure 3:
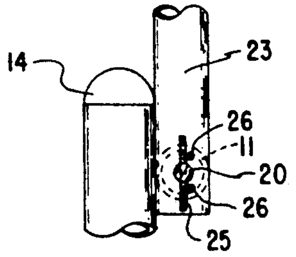
FIG. 3 is a front view from line 3—3 of FIG. 1.

Control means is provided to hold the assembly including the extension 16 in its proper alternative positions. It is evident that various control means may be used. According to the preferred embodiment, a radial pin 25 was pressed through the rod 20 near the knob 22 to provide a fixed means on the rod 20. A pair of stop pins 26 extend axially from the tubular lower rail member 11 and transversely through vertical member 23. These pins 26 provide projections which are not diametrically opposed but are spaced from the diameter enough so that the radial pin 25 will be held by them as shown in FIG. 3. By pulling the rod 20 forward, the radial pin 25 can be disengaged form the stop pins 26 so that the assembly may be rotated. Note that the assembly will be held equally well in two positions 180 degrees apart.

Figure 4:
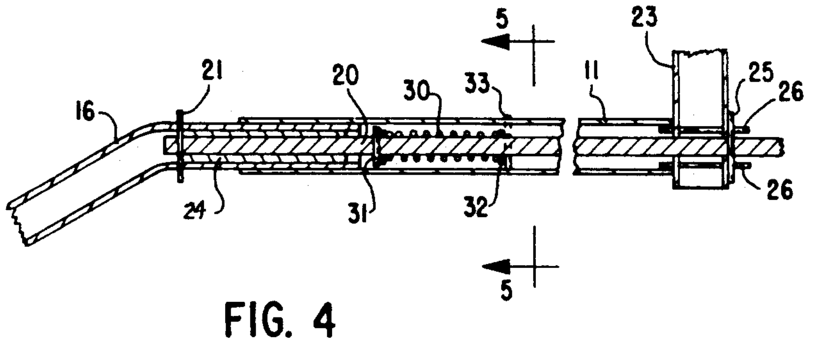
FIG. 4 is a sectional view through the lower frame member of the chair in which the anti-tipping device is enclosed.
Figure 5:
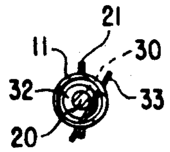
FIG. 5 is a sectional view from line 5—5 of FIG. 4.

In order to hold the radial pins 25 in normal engagement with the stop pins 26 I provide internal biasing means best shown in FIG. 4. A compression spring 30 is disposed around the rod 20. A ring 31 or similar device permanently in place on the rod provides for holding one end of the spring 30. The other end of the spring butts against a washer 32. This washer is held in place relative to the rail 11. For retrofitted devices, the illustrated device is adequate. A single off center pin 32 extending through the rail 11 but close to the rod 20 may be used. A pair of near parallel pins similarly located on opposite sides of the rod could also be used. For "built in" assemblies, a more permanent stop such as a circumferential ridge formed on the inside of the tube by an external indentation might be used. Thus, the spring is compressed axially between the off-center pins 33 on the rail and the ring 31 on the rod urging the rod toward the rear of the chair, and thus urging the radial pin 25 into engaged position relative to the stop pins 26.

In use for normal travel the wheelchair would be set with the anti-tipping extension in the up position. As one approached an up ramp or curb where there was a perceived possibility of tipping, the chair would be stopped. The operator would reach down, pull the knob 22 on each side forward far enough to disengage the radial pin 25 from the off-center pins 26, then turn the knob 180 degrees and be sure the radial pin 25 was again engaged. If a foot rest assembly interferes with easy handling of the knob 22, it may be necessary to swing the foot rest aside. However, in nearly all chairs such movement should be easily accomplished. The extension 16 is now in the down position. This process would be repeated for both sides of the chair. As soon as the ramp or curb is cleared successfully, the process would be reversed and the chair is again ready for normal travel.

It will be apparent that if further research should show that certain handicapped people could more easily push than pull the knob 22, a holding device could be built at the rear of the rail 11. This might take the shape of a pair of diametrically opposed notches in the rear of the rail to be engaged by a pin or the like fastened to the exterior of the extension 16. In such event, the spring 30 within the rail would have to be reversed, but such reversal is believed well within the ability of one skilled in the art.

I claim as my invention:

1. For use with a wheelchair adapted to roll on a surface and having a frame including a tubular lower rail, an anti-tipping device including an extension having one end rotatably and axially telescoped within said lower rail, said extension extending from a rear end of said lower rail, said extension being bent so that in a first position the end of said extension from said lower rail reaches a point near said surface, motion transmitting means for rotating and sliding said extension affixed to said extension, said motion transmitting means extending axially through said lower rail, and operating means for rotating and sliding said motion transmitting means connected to said motion transmitting means adjacent a front end of said lower rail whereby said extension can be moved rotatably to rotate said extension from the position with one end near the surface to a second position where that end is remote from said surface.

2. The anti-tipping device of claim 1 in which control means is releasably engaged between said frame and said motion transmitting means for rotation of the extension, said control means being thereby adapted to hold said extension releasably in said first and second positions.

3. The anti-tipping device of claim 1 in which said motion transmitting means comprises a rod extending through said lower rail, said extension being fixed to said rod, said operating means being fixed to said rod whereby said extension may be turned with said rod.

4. The anti-tipping device of claim 2 in which said control means is released and engaged by longitudinal movement of said motion transmitting means relative to said lower rail.

5. The anti-tipping device of claim 4 in which spring means engaged between said motion transmitting means and said frame urges said control means into a fixed position, said motion transmitting means being slidable against the urging of said spring means to release said fixed position.

6. For use with a wheelchair adapted to roll on a surface and having a frame including a tubular lower rail, an anti-tipping device including an extension having one end rotatably and axially telescoped within said lower rail, said extension extending from a rear end of said lower rail, said extension being bent so that in a first position the end of said extension remote from said lower rail reaches a point near said surface, a rod attached to said extension and extending through said lower rail, operating means for rotating and sliding said rod attached to said rod opposite said extension adjacent a front end of said lower rail whereby said extension can be moved from said first position to a second position in which said end of the extension remote from the lower rail is raised from said surface.

7. The anti-tipping device of claim 6 in which control means is releasably engaged between said frame and said rod for holding said extension respectively in said first and second positions.

8. The anti-tipping device of claim 7 in which said control means includes projections extending transversely through said frame and axially from said lower rail engageable with fixed means on said rod, said projections and said fixed means when engaged being adapted to hold said rod relative to said lower rail, said fixed means being releasable from said projections by longitudinal movement of said rod relative to said lower rail, said control means being adapted to control said rotational movement.

9. The anti-tipping device of claim 8 in which spring means enclosed in said lower rail is engaged between said rod and said lower rail, said spring means being adapted to urge said rod in a longitudinal direction to keep said fixed means and said projections in engagement.

* * * * *